United States Patent
Fenny et al.

(10) Patent No.: US 11,731,772 B2
(45) Date of Patent: Aug. 22, 2023

(54) HYBRID PROPULSION DRIVE TRAIN SYSTEM FOR TILTROTOR AIRCRAFT

(71) Applicant: Bell Helicopter Textron Inc., Fort Worth, TX (US)

(72) Inventors: Carlos Alexander Fenny, Fort Worth, TX (US); John Robert Wittmaak, Jr., Newark, TX (US); Mike John Ryan, Colleyville, TX (US); Joseph Scott Drennan, Dallas, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 291 days.

(21) Appl. No.: 15/896,383

(22) Filed: Feb. 14, 2018

(65) Prior Publication Data
US 2018/0251226 A1    Sep. 6, 2018

Related U.S. Application Data

(60) Provisional application No. 62/465,934, filed on Mar. 2, 2017.

(51) Int. Cl.
*B64D 27/24* (2006.01)
*B64C 29/00* (2006.01)
(Continued)

(52) U.S. Cl.
CPC .......... *B64D 27/24* (2013.01); *B64C 29/0033* (2013.01); *F01D 15/10* (2013.01);
(Continued)

(58) Field of Classification Search
CPC .............. B64D 27/24; B64D 2027/026; B64D 29/0033; B64D 27/20; F02C 6/00; F02C 6/02; B64C 29/0033
See application file for complete search history.

(56) References Cited

U.S. PATENT DOCUMENTS

| 4,504,029 A | 3/1985 | Eickmann |
| 4,856,732 A * | 8/1989 | Eickmann ............... B64C 27/20 244/2 |

(Continued)

FOREIGN PATENT DOCUMENTS

| CA | 2997285 | 9/2018 |
| CN | 101535123 A | 9/2009 |

(Continued)

OTHER PUBLICATIONS

Canadian Intellectual Property Office, Examination Report for Canadian Patent Appl. 2,997,285 dated Apr. 2, 2019—4 pp.

(Continued)

*Primary Examiner* — Richard Green
*Assistant Examiner* — Arfan Y. Sinaki
(74) *Attorney, Agent, or Firm* — Daniel J. Chalker; Edwin S. Flores; Chalker Flores, LLP

(57) ABSTRACT

The present invention includes a hybrid propulsion system for an aircraft comprising: one or more turboshaft engines that provide shaft power and are capable of providing thrust; at least one of: one or more electrical generators or one or more hydraulic pumps connected to a shaft of the one or more turboshaft engines; and at least two rotatable nacelles, each nacelle housing at least one of: one or more electric motors or one or more hydraulic motors each connected to a proprotor, wherein the electric motor is electrically connected to the electric generator, or the hydraulic motor is connected to the hydraulic pump, respectively, wherein the proprotors provide lift whenever the aircraft is in vertical takeoff and landing and stationary flight, and provide thrust whenever the aircraft is in forward flight.

32 Claims, 11 Drawing Sheets

(51) Int. Cl.
  *F01D 15/10* (2006.01)
  *B64D 27/02* (2006.01)
(52) U.S. Cl.
  CPC .. *B64D 2027/026* (2013.01); *F05D 2220/328* (2013.01); *F05D 2220/76* (2013.01); *Y02T 50/60* (2013.01)

(56) References Cited

U.S. PATENT DOCUMENTS

| | | | | |
|---|---|---|---|---|
| 4,982,914 | A * | 1/1991 | Eickmann | B64D 31/14 |
| | | | | 244/56 |
| 6,644,588 | B2 | 11/2003 | King et al. | |
| 6,729,575 | B2 * | 5/2004 | Bevilaqua | F02K 1/006 |
| | | | | 244/12.3 |
| 7,571,879 | B2 | 8/2009 | Builta et al. | |
| 9,776,714 | B2 * | 10/2017 | Shapery | B64C 29/0075 |
| 10,000,293 | B2 * | 6/2018 | Hamel | B64C 21/06 |
| 10,071,801 | B2 * | 9/2018 | North | B64C 25/52 |
| 10,082,040 | B2 * | 9/2018 | Gallet | F02K 3/077 |
| 2007/0034739 | A1 | 2/2007 | Yoeli | |
| 2009/0224096 | A1 | 9/2009 | Waide | |
| 2011/0024555 | A1 * | 2/2011 | Kuhn, Jr. | B64C 29/0033 |
| | | | | 244/17.11 |
| 2012/0292456 | A1 * | 11/2012 | Hollimon | B64C 27/28 |
| | | | | 244/7 A |
| 2014/0103158 | A1 * | 4/2014 | Berry | B64C 29/0025 |
| | | | | 244/12.1 |
| 2016/0200436 | A1 | 7/2016 | North et al. | |
| 2016/0229532 | A1 | 8/2016 | Shapery | |
| 2016/0244158 | A1 * | 8/2016 | Fredericks | B64C 25/52 |
| 2018/0051654 | A1 * | 2/2018 | Suciu | B64C 11/46 |
| 2018/0170564 | A1 * | 6/2018 | Vaillant | F02C 3/00 |
| 2018/0229606 | A1 * | 8/2018 | Vondrell | B64C 39/024 |
| 2020/0148375 | A1 * | 5/2020 | Huang | B64D 27/10 |

FOREIGN PATENT DOCUMENTS

| | | |
|---|---|---|
| CN | 102905972 A | 1/2013 |
| CN | 105752345 A | 7/2016 |
| CN | 108528734 A | 9/2018 |
| EP | 0356541 A1 | 3/1990 |
| EP | 3360781 A1 | 8/2018 |
| EP | 3369655 A1 | 9/2018 |
| WO | 2015/138217 A1 | 9/2015 |

OTHER PUBLICATIONS

Canadian Intellectual Property Office, Examination Report for Canadian Patent Appl. 2,997,285 dated Jan. 21, 2020—4 pp.
European Patent Office, European Search Report for EP Application No. 18157978.0 dated Apr. 16, 2018, 5 pp.
Goncalves, Sarah "DARPA's Experimental VTOL Plane Looks like the Osprey of Tomorrow" Aug. 3, 2016, oo 1-2, XP055462683, Retrieved from the Internet: URL:https://www.ecnmag.com/glob/2016/03/darpas-experimental-vtol-plane-looks-osprey-tomorrow.
European Patent Office, Communication pursuant to Article 94(3) EPC for EP Application No. 18157978.0 dated May 8, 2018, 6 pp.
European Patent Office, Communication pursuant to Article 94(3) EPC for EP Application No. 18157978.0 dated Oct. 23, 2018, 6 pp.
Canadian Intellectual Property Office, Examination Report for Canadian Patent Appl. 2,997,285 dated Sep. 2, 2020—5 pp.
China National Intellectual Property Administration, Examination Report for Chinese Appl. No. 201810175125.6 dated Jan. 4, 2021, 22 pp (with English Summary).
Canadian Intellectual Property Office, Examination Report for Canadian Patent Appl. 2,997,285 dated Apr. 15, 2021—5 pp.
China National Intellectual Property Administration, Examination Report for Chinese Appl. No. 201810175125.6 dated Aug. 26, 2021, 7 pp (with English Summary).
Canadian Intellectual Property Office, Examination Report for Canadian Patent Appl. 2,997,285 dated Nov. 19, 2021—4 pp.

* cited by examiner

HYBRID PROPULSION DRIVE TRAIN SYSTEM FOR TILTROTOR AIRCRAFT

CROSS-REFERENCE TO RELATED APPLICATIONS

This patent application claims priority to U.S. provisional patent application Ser. No. 62/465,934 filed on Mar. 2, 2017 entitled "Hybrid Propulsion Drive Train System for Tiltrotor Aircraft," all of which is hereby incorporated by reference in its entirety.

STATEMENT OF FEDERALLY FUNDED RESEARCH

Not applicable.

TECHNICAL FIELD OF THE INVENTION

The present invention relates in general to the field of aircraft, and more particularly, to a hybrid propulsion system for tiltrotor aircraft.

BACKGROUND OF THE INVENTION

Without limiting the scope of the invention, its background is described in connection with tiltrotor aircraft.

U.S. Pat. No. 7,571,879, issued to Builta, et al., is entitled "Automatic conversion system for tiltrotor aircraft", and teaches a method for automatically controlling the conversion of a tiltrotor aircraft. An airspeed command for the tiltrotor aircraft is received. The airspeed command is converted to a pylon position, wherein a difference between the airspeed command and a measured airspeed is calculated. The difference between the airspeed command and a measured airspeed is converted to a dynamic pylon position, and a total pylon position is calculated from the pylon position and the dynamic pylon position. A pylon of the tiltrotor aircraft is moved to the total pylon position. Another embodiment of the present invention is a system for calculating a position of a pylon of a tiltrotor aircraft based on an airspeed command. The system includes an airspeed command module, a pylon trim position module, a dynamic pylon position module, and a pylon position module.

U.S. Pat. No. 6,644,588, issued to King, et al., is entitled, "Multi-mode tiltrotor nacelle control system with integrated envelope protection," and teaches a tiltrotor aircraft that has a multi-mode tiltrotor nacelle control system with integrated envelope protection. The tiltrotor aircraft has a fuselage, a tail section, a left wing member, a right wing member, a right engine nacelle, a left engine nacelle, a left proprotor, and a right proprotor. Activation of the nacelle control system causes preselected rotational movement of the tiltrotor assembly.

SUMMARY OF THE INVENTION

In one embodiment, the present invention includes a hybrid propulsion system for a tiltrotor craft comprising: one or more engines that drive a shaft; at least one of: one or more electrical generators or one or more hydraulic pumps, connected to the shaft of the one or more engines; and at least two rotatable nacelles, each nacelle housing at least one of: one or more electric motors or one or more hydraulic motors, each connected to a proprotor; wherein the one or more electric motors is electrically connected to the one or more electric generators, or the one or more hydraulic motors is connected to the one or more hydraulic pumps, respectively; and wherein the proprotors provide lift whenever the tiltrotor craft is in vertical takeoff and landing and stationary flight, and provide thrust whenever the tiltrotor craft is in forward flight. In one aspect, the tiltrotor craft is manned or unmanned. In another aspect, the one or more engines provide: direct, distributed, or direct and distributed, thrust during forward flight. In another aspect, the system further comprises one or more ducted fans, one or more variable pitch fans, or both, wherein the one or more ducted fans or the one or more variable pitch fans, or both, are connected to an electric motor, a hydraulic motor, or both, to provide additional thrust during forward flight. In another aspect, the system further comprises one or more ducted fans, one or more variable pitch fans, or both, wherein the one or more engines are directly connected via an electrical generator and electric motor, or a hydraulic pump and hydraulic motor, or both, to the one or more ducted fans. In another aspect, the system further comprises one or more ducted fans, one or more variable pitch fans, or both, wherein the one or more engines are indirectly connected via an electrical generator and electric motor, or a hydraulic pump and hydraulic motor, or both, to the one or more ducted fans. In another aspect, the system further comprises one or more ducted fans, one or more variable pitch fans, or both, wherein the one or more engines are connected to an electrical generator that is electrically connected to an electric motor, wherein the electric motor is connected to a variable pitch fan or ducted fan that provides additional thrust during forward flight, wherein the electric motor drives the one or more variable pitch fans or ducted fans that are positioned at least one of upstream, adjacent to, or downstream from, the one or more engines. In another aspect, the system further comprises one or more ducted fans, one or more variable pitch fans, or both, wherein the one or more engines are connected to a hydraulic pump that is hydraulically connected to a hydraulic motor, wherein the hydraulic motor is connected to a variable pitch fan or ducted fan that provides additional thrust during forward flight, wherein the hydraulic motor drives the one or more variable pitch fans or ducted fans that are positioned at least one of upstream, adjacent to, or downstream from, the one or more engines. In another aspect, the one or more engines comprise a turboshaft engine or a high bypass engine. In another aspect, the system further comprises a reduction gearbox positioned between the one or more engines and the one or more electrical generators or the one or more hydraulic pumps. In another aspect, the system further comprises a proprotor reduction gearbox positioned between at least one of: the one or more electrical motors or the one or more hydraulic motors, or both, and the proprotor. In another aspect, the proprotors are driven directly by the at least of: one or more electrical motors, the one or more hydraulic motors, or both. In another aspect, the one or more engines are defined further as one or more turboshaft engines, or one or more distributed engines that are not mechanically connected to one or more rotors or fans, wherein the one or more turboshaft engines or the one or more distributed engines provide additional thrust during forward flight. In another aspect, the system further comprises an electric slip ring that electrically connects the one or more electrical generators to the one or more electrical motors in each of the nacelles. In another aspect, the system further comprises a hydraulic swivel that hydraulically connects the one or more hydraulic pumps to the one or more hydraulic motors in each of the nacelles. In another aspect, the tiltrotor craft comprises, respectively: one to four electric generators connected to the one or more engines and connected one to four electric motors in each nacelle, or, one to four hydraulic pumps connected to the one or more turboshaft engines and connected to one to four hydraulic motors in each nacelle, or a combination thereof. In another aspect, each of the proprotors are stop-fold proprotors.

In another embodiment, the present invention includes a method of providing propulsion to a tiltrotor craft comprising: providing one or more engines comprising a shaft; driving one or more electrical generators, one or more hydraulic pumps, or both, each connected to the shaft of the engine; and providing at least two nacelles, each nacelle comprising at least one of: one or more electric motors or one or more hydraulic motors each connected to a proprotor, wherein the electric motor is electrically connected to the electric generator, or the hydraulic motor is connected to the hydraulic pump, respectively; generating an electrical power from the electrical generators, or a hydraulic power from the hydraulic pumps; transmitting electrical power to the electric motors in the nacelles, or hydraulic power to the hydraulic motors in the nacelles, or both; and rotating the proprotors using the electrical motors, the hydraulic motors, or both, to provide lift whenever the tiltrotor craft is in vertical takeoff and landing and stationary flight, and to provide forward thrust whenever the tiltrotor craft is in forward flight. In one aspect, the tiltrotor craft is manned or unmanned. In another aspect, the one or more engines provide: direct, distributed, or direct and distributed, thrust during forward flight. In another aspect, each of the nacelles is rotatable. In another aspect, the method further comprises connecting one or more ducted fans, one or more variable pitch fans, or both, wherein the one or more ducted fans or the one or more variable pitch fans, or both, are connected to an electric motor, a hydraulic motor, or both, to provide additional thrust during forward flight. In another aspect, the method further comprises directly connecting one or more ducted fans, one or more variable pitch fans, or both, to the one or more engines via an electrical generator and electric motor, or a hydraulic pump and hydraulic motor, or both, to provide additional thrust during forward flight. In another aspect, the method further comprises indirectly connecting one or more ducted fans, one or more variable pitch fans, or both, to the one or more engines via an electrical generator and electric motor, or a hydraulic pump and hydraulic motor, or both, to provide additional thrust during forward flight. In another aspect, the method further comprises connecting one or more ducted fans, one or more variable pitch fans, or both, to the one or more engines via an electrical generator that is electrically connected to an electric motor, wherein the electric motor drives the one or more variable pitch fans or ducted fans that are positioned at least one of upstream, adjacent to, or downstream from, the one or more engines. In another aspect, the method further comprises connecting one or more ducted fans, one or more variable pitch fans, or both, to the one or more engines via a hydraulic pump that is hydraulically connected to a hydraulic motor, wherein the hydraulic motor drives the one or more variable pitch fans or ducted fans that are positioned at least one of upstream, adjacent to, or downstream from, the one or more engines. In another aspect, the one or more engines comprise a turboshaft engine or a high bypass engine. In another aspect, the method further comprises positioning a reduction gearbox between the one or more engines and the one or more electrical generators or the one or more hydraulic pumps. In another aspect, the method further comprises positioning a proprotor reduction gearbox between at least one of: the one or more electrical motors or the one or more hydraulic motors, or both, and the proprotor. In another aspect, the method further comprises directly driving each of the proprotors with the at least of: one or more electrical motors, the one or more hydraulic motors, or both. In another aspect, the one or more engines are defined further as: one or more turboshaft engines or one or more distributed engines that are not mechanically connected to one or more rotors or fans, wherein the one or more turboshaft engines or the one or more distributed engines provide additional thrust during forward flight. In another aspect, the method further comprises positioning an electric slip ring to electrically connect the one or more electrical generators to the one or more electrical motors in the nacelles. In another aspect, the method further comprises positioning a hydraulic swivel to hydraulically connect the one or more hydraulic pumps to the one or more hydraulic motors in the nacelles. In another aspect, the tiltrotor craft comprises, respectively: one to four electric generators connected to the one or more engines and connected one to four electric motors in each nacelle, or, one to four hydraulic pumps connected to the one or more turboshaft engines and connected to one to four hydraulic motors in each nacelle, or a combination thereof. In another aspect, each of the proprotors are stop-fold proprotors.

In yet another embodiment, the present invention includes a hybrid propulsion system for an aircraft comprising: a turboshaft engine that provides shaft power and distributed thrust, wherein the turboshaft engine is connected directly or indirectly to one or more ducted fans, one or more variable pitch fans, or both, wherein the one or more ducted fans or the one or more variable pitch fans, or both, provide a first thrust during forward flight; at least one of: one or more electrical generators or one or more hydraulic pumps connected to the shaft of the turboshaft engine; and at least two nacelles, each nacelle comprising at least one of: one or more electric motors or one or more hydraulic motors each connected to a proprotor, wherein the electric motor is electrically connected to the electric generator, or the hydraulic motor is connected to the hydraulic pump, respectively, wherein the proprotors provide lift whenever the aircraft is in vertical takeoff and landing and stationary flight, and provide a second thrust whenever the aircraft is in forward flight.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
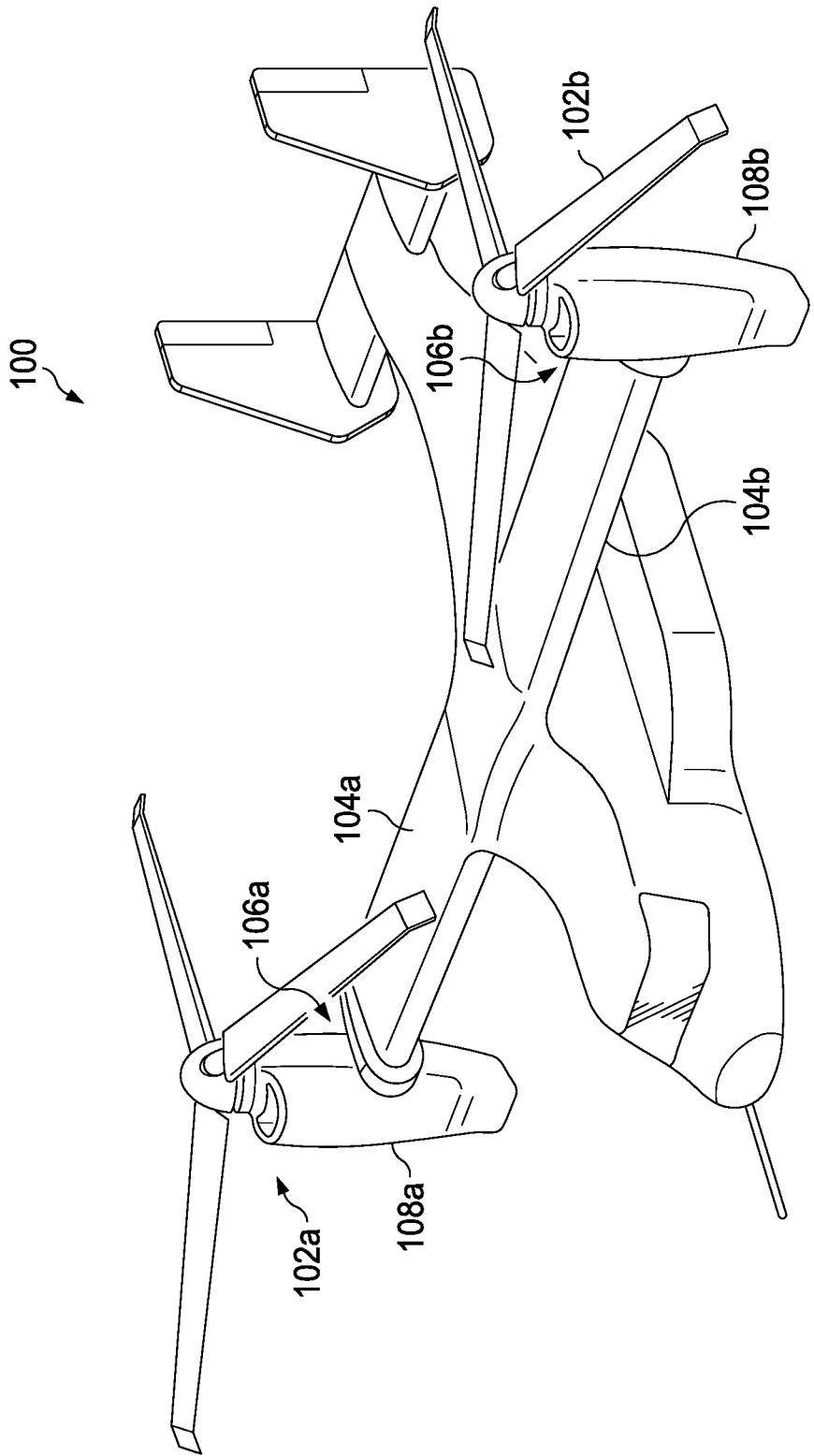
FIG. 1 shows a perspective view of a tiltrotor aircraft that can use the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Helicopters are incredibly useful aircraft allowing for vertical takeoff, hovering and vertical landing. However, helicopter speed and range performance falls far short of that provided by conventional fixed wing airplanes. The development of tiltrotor technology has increased the speed rotorcraft speed to over 300 MPH (482 KPH) and extended range to approach the performance of conventional turboprop aircraft. Tiltrotor speed performance still falls short of what can be achieved by conventional jet propulsion aircraft.

Jet fighter/attack aircraft such as the AV-8B Harrier and F-35 Lightning utilize jet thrust to provide vertical takeoff, hovering and vertical landing, and can obtain speeds of over 600 MPH (965 KPH). But the penalty for using jet thrust to provide vertical lift is dramatically reduced useful payload and range performance. Reduced payload and range performance is a direct consequence of the high disc loading (projected area of lift thrust) when using jet thrust to provide vertical lift. The relatively low disc loading of helicopters and tiltrotors allows for efficient vertical lift.

In a conventional tiltrotor, a mechanical propulsion system drive train provides necessary safety, reliability, and operating performance at an acceptable weight. However, to support the unique operating requirements for a stop-fold tilt rotor, the addition of a high speed clutch, rotor phasing unit, and convertible engine can result in unacceptable loss of propulsion system reliability and an undesirable increase in aircraft weight.

The hybrid propulsion system of the present invention can use a stop-fold proprotor, for conversion between helicopter and airplane modes by rotation of the pylons. With the stop fold tiltrotor operating in airplane mode, aircraft speed is increased further as the convertible engine transitions into a turbo jet to provide forward thrust and the rotors are slowed to a stop. Once the rotors are stopped they are folded back against the pylons to reduce aerodynamic drag and permit additional increase in speed.

FIG. 1 shows a tiltrotor aircraft 100 that utilizes the system in accordance with the present application. Tiltrotor aircraft 100 includes tilt rotor assemblies 102*a* and 102*b* that are carried by wings 104*a* and 104*b*, and are disposed at end portions 106*a* and 106*b* of wings 104*a* and 104*b*, respectively. Tilt rotor assemblies 102*a* and 102*b* include nacelles 108*a* and 108*b*, which carry the engines and transmissions of tiltrotor aircraft 100. Tilt rotor assemblies 102*a* and 102*b* move or rotate relative to wing members 104*a* and 104*b* between a helicopter or hover mode in which tilt rotor assemblies 102*a* and 102*b* are tilted upward, such that tiltrotor aircraft 100 flies like a conventional helicopter; and an airplane or cruise mode in which tilt rotor assemblies 102*a* and 102*b* are tilted forward, such that tiltrotor aircraft 100 flies like a conventional propeller driven aircraft.

Figure 2:
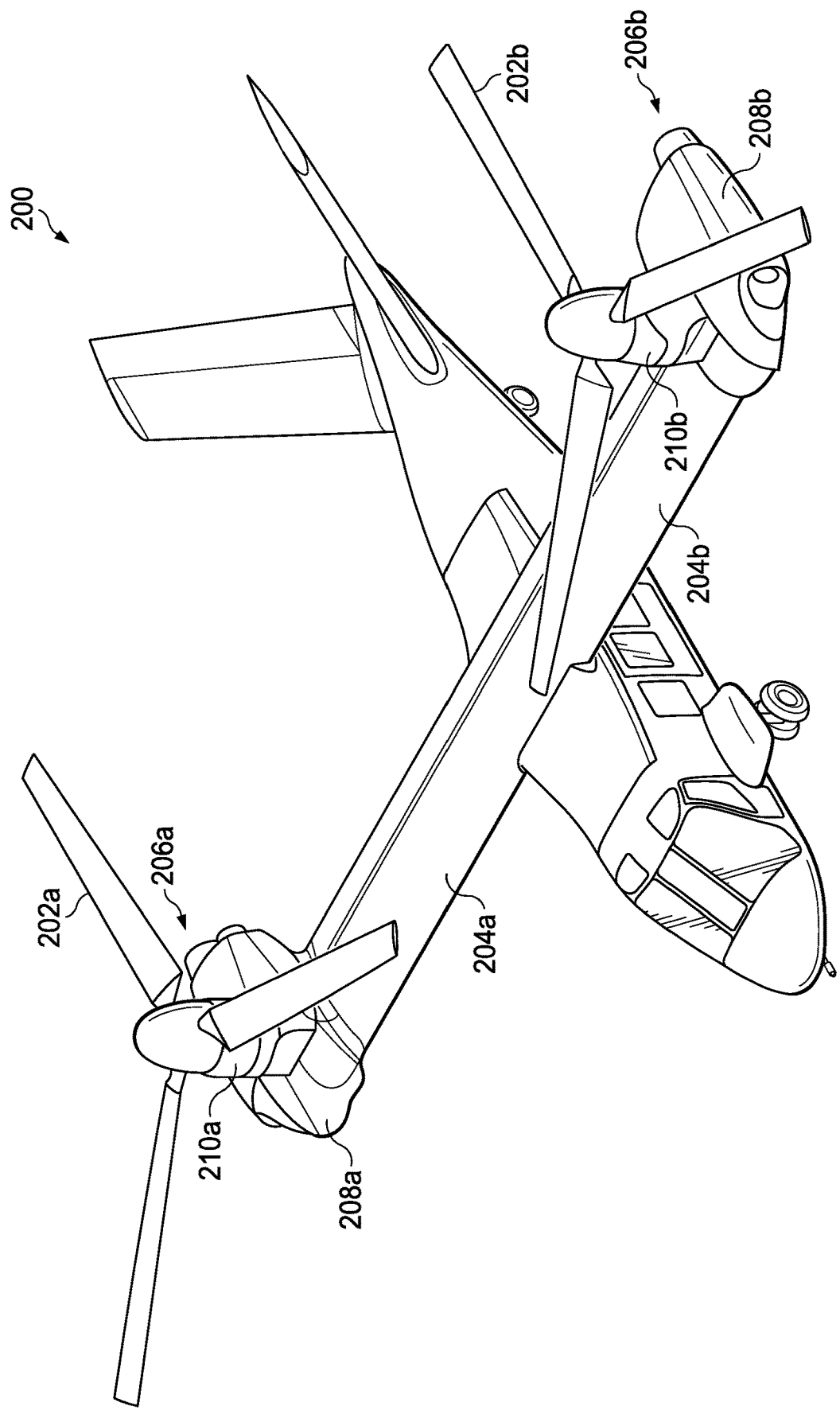
FIG. 2 shows a perspective view of another tiltrotor aircraft that can also use the present application.

FIG. 2 shows another tiltrotor aircraft 200 that utilizes the system in accordance with the present application. Tiltrotor aircraft 200 includes tilt rotor assemblies 202*a* and 202*b* that are carried by wings 204*a* and 204*b*, and are disposed at end portions 206*a* and 206*b* of wings 204*a* and 204*b*, respectively. Tilt rotor assemblies 202*a* and 202*b* include nacelles 208*a* and 208*b*, which include the engines and transmissions of tiltrotor aircraft 200. In this embodiment, the engines are fixed to the wing and do not rotate, rather, only the pylons 210*a* and 210*b* with the tilt rotor assemblies 202*a* and 202*b* rotate. Tilt rotor assemblies 202*a* and 202*b* move and rotate relative to wing members 204*a* and 204*b* and the nacelles 208*a* and 208*b*. The tilt rotor assemblies 202*a* and 202*b* do not more relative to the wing members 204*a* and 204*b*. Instead, during the transition between a helicopter or hover mode only the pylons 210*a* and 210*b* with the tilt rotor assemblies 202*a* and 202*b* rotate to redirect the thrust from the tilt rotor assemblies 202*a* and 202*b*. The tiltrotor aircraft 200 is still able to fly like a conventional helicopter; and an airplane or cruise mode in which one of the rotors are tilted forward, such that tiltrotor aircraft 200 flies like a conventional propeller driven aircraft.

The invention of a hybrid propulsion drive train system for tiltrotor aircraft, which can be a stop-fold tiltrotor aircraft, that resolves the reliability and weight penalties of a mechanical propulsion system drive train by replacing gearboxes, drive shafts, clutches, and phasing units with redundant high-speed electric motors, electric generators and multiple electrics power distribution busses. Alternatively, the hybrid propulsion drive train system may be configured using redundant high-speed hydraulic motors, hydraulic pumps and multiple hydraulic power distribution systems. The skilled artisan will recognize that a combination of both the electric and hydraulic system may also be used in certain configurations.

Hybrid propulsion as configured in this invention eliminates the use of gearboxes and drive shafts to distribute power from the engine to the prop rotors. In one example, a turbo shaft engine is connected to a reduction gearbox that drives redundant electric generators (e.g., high-speed electric generators) or hydraulic pumps to provide electric or hydraulic power, respectively. Power from the electric generators or hydraulic pumps is conveyed, respectively, to electric or hydraulic motors on the pylons that drive the proprotor gearboxes via multiple electrics power distribution busses or multiple hydraulic power distribution systems. The application of redundant electric and/or hydraulic power distribution systems supports required safety/reliability requirements while providing for simplified airframe routing over mechanical drive shafts. The hybrid power drive train system provides for variable speed operation of the rotors down to zero RPM, thus, the requirement for a high-speed clutch and a rotor-phasing unit is eliminated. As such, the present invention includes a hybrid propulsion drive train system that does not include or require a high-speed clutch and/or a rotor-phasing unit.

A major impediment to the development of a tiltrotor aircraft, such as a stop-fold tiltrotor aircraft, is the absence of an existing convertible engine capable of continuous overlapping transition between turbo-shaft and turbo-jet operating modes. The hybrid propulsion drive train system for tiltrotor aircraft of the present invention utilizes existing internal combustion, jet, or turbo shaft engine technology, thereby the eliminating the requirement for a convertible engine.

In modern high bypass jet engines, the majority of the thrust is generated from a ducted fan in front of the engine, not from the flow of hot combustion gases passing through the engine as with early jet engines. Very large air-flow at relatively low differential to aircraft speed generated by the high bypass configuration increases engine efficiency, resulting in reduced fuel consumption. This is why commercial jet aircraft nacelles have grown in diameter with the demand for increased fuel efficiency. The greater the volume of bypass air, the greater the engine efficiency.

To increase propulsion efficiency it is now possible to separate the fan from the engine completely, thus, locating the individual components in the aircraft to maximize aerodynamic efficiency and provide for variable fan speed operation. This is commonly known as "distributed propulsion". Power generated from engines, such as a turbo shaft engine, is transmitted to the ducted fans utilizing electric generators on the engine to power electric motors on the variable speed ducted fans.

Figure 3A:
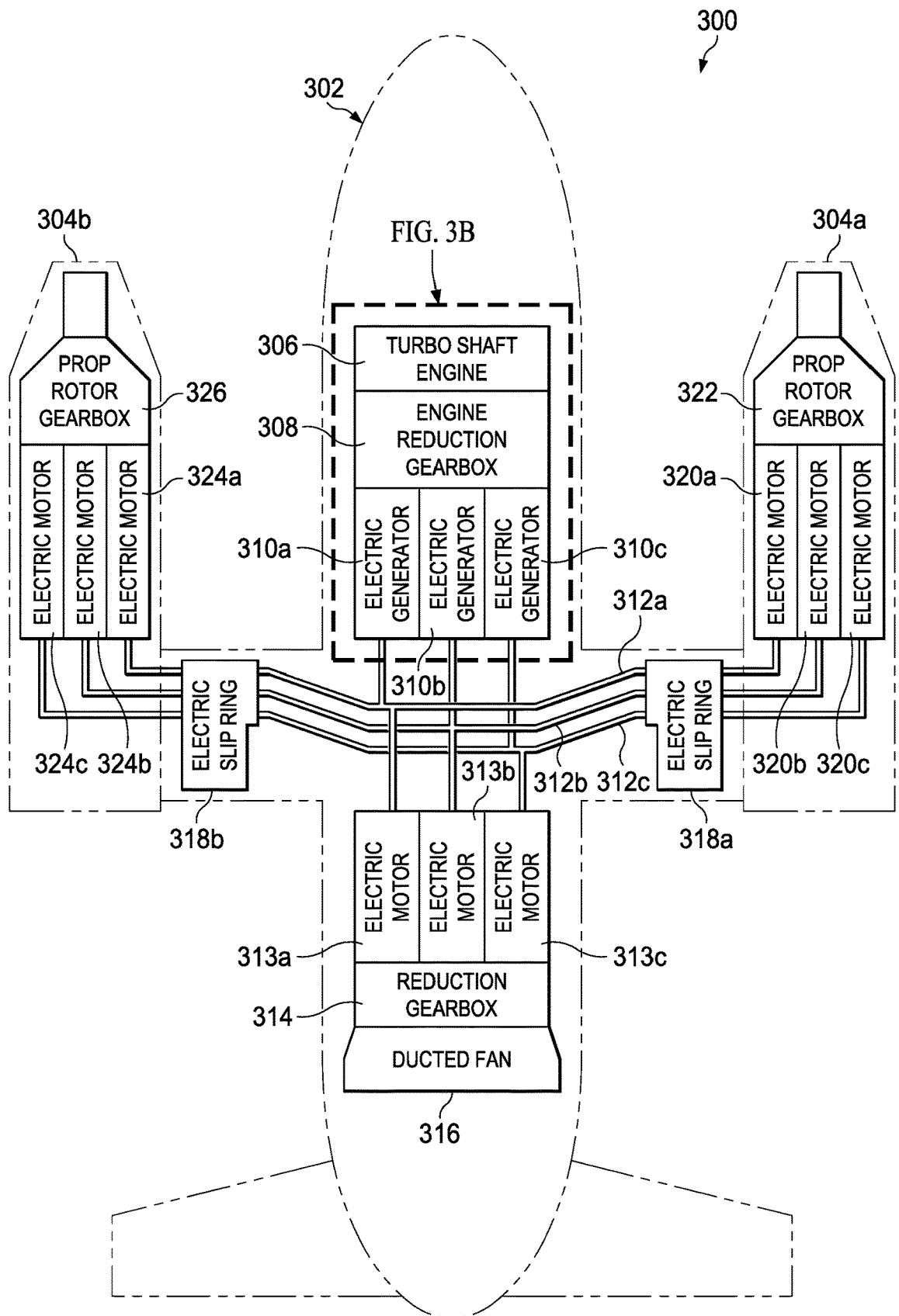
FIGS. 3A and 3B show top views of a tiltrotor high speed motor hybrid electric propulsion system of the present invention.
Figure 3B:
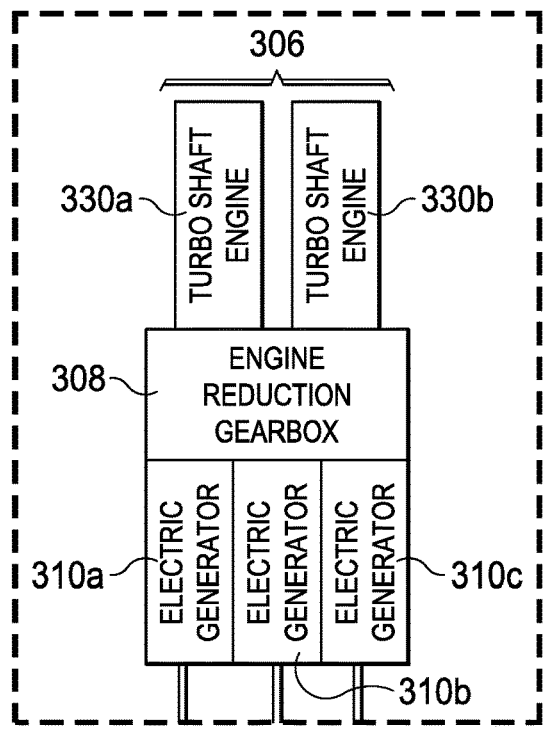

FIG. 3A shows a top-view of an electric hybrid propulsion drive train system of the present invention that incorporates distributed propulsion to provide thrust for high speed and efficient forward flight using ducted fans. Aircraft 300 is depicted having a fuselage 302 and nacelles 304*a*, 304*b*. The fuselage 302 includes one or more engines 306, which is depicted in this embodiment as a single turbo shaft engine that is connected to an engine reduction gearbox 308. Of course, the skilled artisan will recognize that for purposes of redundancy the aircraft 300 can include more than one engine as depicted in the insert. The engine reduction gearbox 308 connected to one or more electric generators (in this version three electric generators 310*a*, 310*b*, and 310*c* are depicted) that convert shaft power from the turbo shaft engine 306 into electrical power. The electric generators 310*a*, 310*b*, and 310*c* are connected, respectively, to power conduits 312*a*, 312*b*, 312*c*. Power conduit 312*a* is connected to electric motors 313*a*, 320*a* and 324*a*. Power conduit 312*b* is connected to electric motors 313*b*, 320*b* and 324*b*. Power conduit 312*c* is connected to electric motors 313*c*, 320*c* and 324*c*. In certain embodiments, the aircraft 300 may be a tiltrotor aircraft and the nacelles 304*a*, 304*b* tilt, which can require, e.g., an electric slip ring 318*a*, 318*b*, respectively, to connect power conduits 312*a*, 312*b*, 312*c* to the respective electric motors. It is possible that the various electric generators 310*a*, 310*b*, 310*c*, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 313*a*, 313*b*, and 313*c* are depicted as driving a reduction gearbox 314 that connected to a ducted fan 316 that is used to provide additional thrust to the aircraft 300. While the ducted fan 316 is depicted in this embodiment as being in the back of the aircraft 300, the skilled artisan will recognize that it may be positioned in front of the engine 306, adjacent to the engine 306 or may include more than one ducted fan 316, such as 1, 2, 3, 4, or more ducted fans. Turning to each of the nacelles 304*a*, 304*b*, each is depicted with three electric motors, however the skilled artisan will recognize that the number of electric motors can be varied depending on power-to-weight curves or restrictions, such as 1, 2, 3, 4, or more electric motors. The electric motors 320*a*, 320*b*, and 320*c* are depicted in nacelles 304*a* connected to drive a prop rotor gearbox 322 that turns a proprotor (not depicted). Likewise, the electric motors 324*a*, 324*b*, and 324*c* are depicted in nacelles 304*b* to connect to and drive a prop rotor gearbox 326 that turns a proprotor (not depicted). Thus, the two nacelles 304*a*, 304*b* are used in a traditional manner as with all tiltrotor or vertical take off and landing craft to provide lift when the proprotors are parallel to the ground and upon take off will rotate to a position generally perpendicular to the flight during forward flight providing thrust. In certain embodiments, such as when the proprotors are foldable during flight, the proprotors may be used primarily for the initial take-off and landing, but the ducted fan 316 may provide addition thrust or be the primary or sole source of thrust during forward flight. FIG. 3B shows the turbo shaft engine 306 in an expanded view that depicts two turbo shaft engines 330*a*, 330*b*, that connect to the engine reduction gearbox 308. The aircraft 300 may include 1, 2, 3, 4, or more engines. Of course, in certain embodiments the engines may be conventional jet engines or even standard combustion engines, so long as they provide shaft power to drive the reduction gearbox 314 that provides power to ducted fan 316.

Figure 4B:
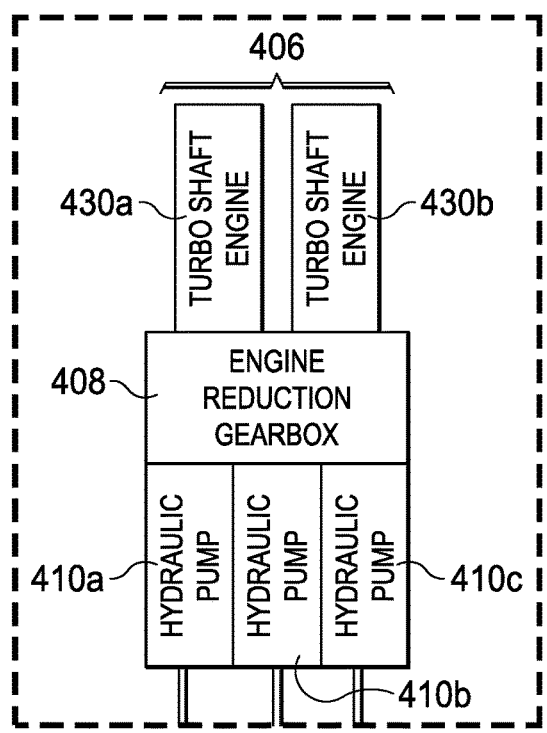
FIGS. 4A and 4B show top views of a tiltrotor high speed motor hybrid hydraulic propulsion system of the present invention.
Figure 4A:
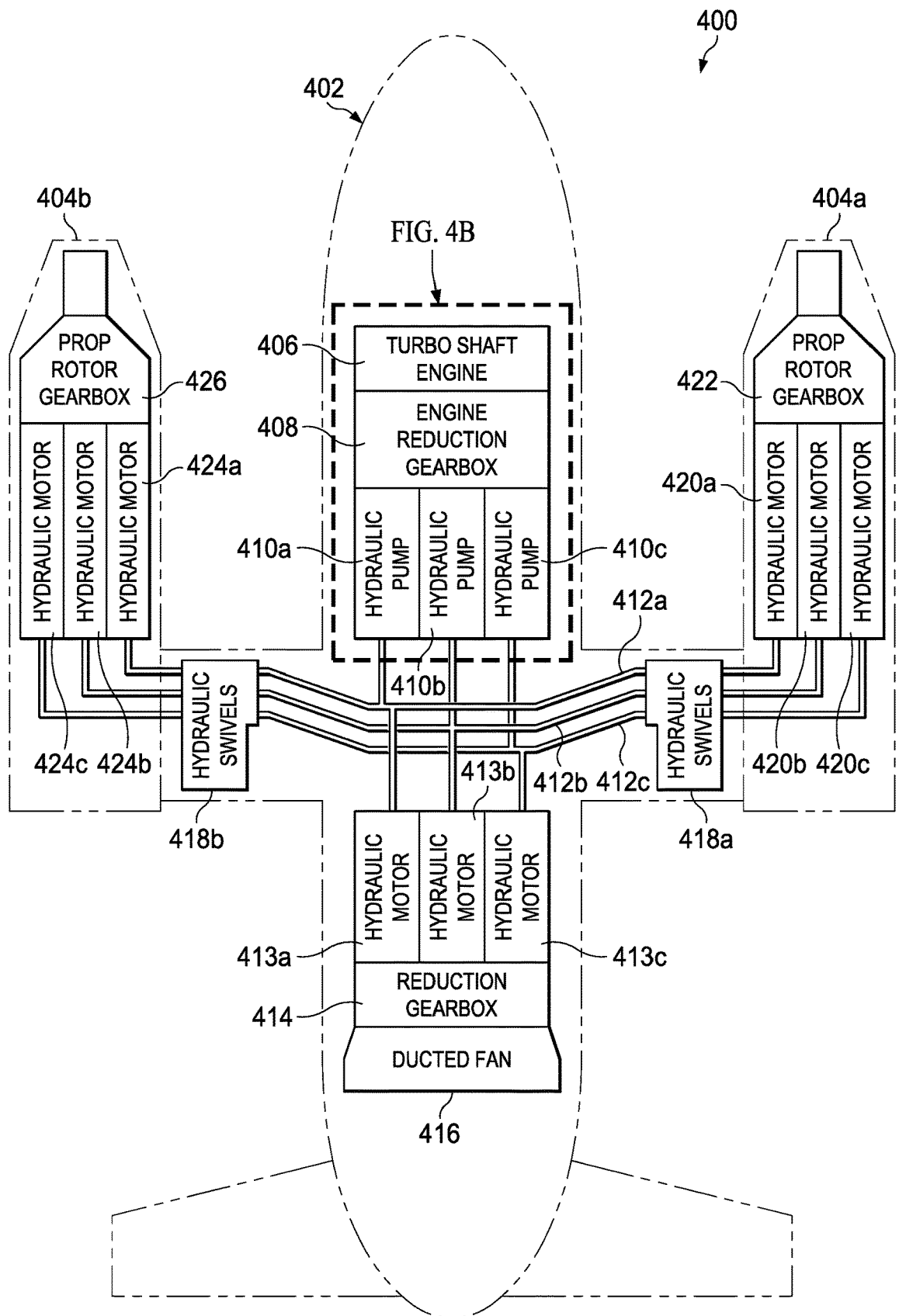

FIG. 4A shows a top-view of a hydraulic hybrid propulsion drive train system of the present invention that incorporates distributed propulsion to provide thrust for high speed and efficient forward flight using ducted fans. Aircraft 400 is depicted having a fuselage 402 and nacelles 404*a*, 404*b*. The fuselage 402 includes one or more engines 406, which is depicted in this embodiment as a single turbo shaft engine that is connected to an engine reduction gearbox 408. Of course, the skilled artisan will recognize that for purposes of redundancy the aircraft 400 can include more than one engine as depicted in the insert. The engine reduction gearbox 408 connected to one or more hydraulic pumps (in this version three hydraulic pumps 410*a*, 410*b*, and 410*c* are depicted) that convert shaft power from the turbo shaft engine 406 into hydraulic power. The hydraulic pumps 410*a*, 410*b* and 410*c* are connected, respectively, to hydraulic fluid conduits 412*a*, 412*b*, 412*c*. Hydraulic fluid conduit 412*a* is connected to hydraulic motors 413*a*, 420*a* and 424*a*. Hydraulic fluid conduit 412*b* is connected to hydraulic motors 413*b*, 420*b* and 424*b*. Hydraulic fluid conduit 412*c* is connected to hydraulic motors 413*c*, 420*c* and 424*c*. In certain embodiments, the aircraft 400 may be a tiltrotor aircraft and the nacelles 404*a*, 404*b* tilt, which can require, e.g., an hydraulic swivels 418*a*, 418*b*, respectively, to connect hydraulic fluid conduits 412*a*, 412*b*, 412*c* to the respective hydraulic motors. It is possible that the various hydraulic pumps 410*a*, 410*b*, 410*c*, power a single large hydraulic motor, however, for applications in which redundancy is preferred (such as manned aircraft), it will be common to include 1, 2, 3, 4, or more hydraulic motors. The number of hydraulic motors can be optimized by, e.g., factoring the weight of the hydraulic motor, the speed of the hydraulic motor, the torque of the hydraulic motor, the weight of the aircraft, etc. In this embodiment, the hydraulic motors 413a, 413b, and 413c are depicted as driving a reduction gearbox 414 that connected to a ducted fan 416 that is used to provide additional thrust to the aircraft 400. While the ducted fan 416 is depicted in this embodiment as being in the back of the aircraft 400, the skilled artisan will recognize that it may be positioned in front of the engine 406, adjacent to the engine 406 or may include more than one ducted fan 416, such as 1, 2, 3, 4, or more ducted fans. Turning to each of the nacelles 404a, 404b, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 420a, 420b and 420c are depicted in nacelles 404a connected to drive a prop rotor gearbox 422 that turns a proprotor (not depicted). Likewise, the hydraulic motors 424a, 424b and 424c are depicted in nacelles 404b to connect to and drive a prop rotor gearbox 426 that turns a proprotor (not depicted). Thus, the two nacelles 404a, 404b are used in a traditional manner as with all tiltrotor or vertical take off and landing craft to provide lift when the proprotors are parallel to the ground and upon take off will rotate to a position generally perpendicular to the flight during forward flight providing thrust. In certain embodiment, such as when the proprotors are foldable during flight, the proprotors may be used primarily for the initial take-off and landing, but the ducted fan 416 may provide addition thrust or be the primary or sole source of thrust during forward flight. FIG. 4B shows turbo shaft engine 406 in an expanded view that depicts two turbo shaft engines 430a, 430b, which connect to the engine reduction gearbox 408. The aircraft 400 may include 1, 2, 3, 4, or more engines. Of course, in certain embodiments the engines may be conventional jet engines or even standard combustion engines, so long as they provide shaft power to drive the reduction gearbox 414 that provides power to ducted fan 416.

The present invention also includes the combination of both electric generators connected to electric motors, and hydraulic pumps connected to hydraulic motors on the same aircraft. While generally only one type of torque-converting power will typically be used, it is possible that certain configurations, size, weight, and torque requirements may include at least one or more electric and one or more hydraulic system(s) in the same aircraft.

Figure 5A:
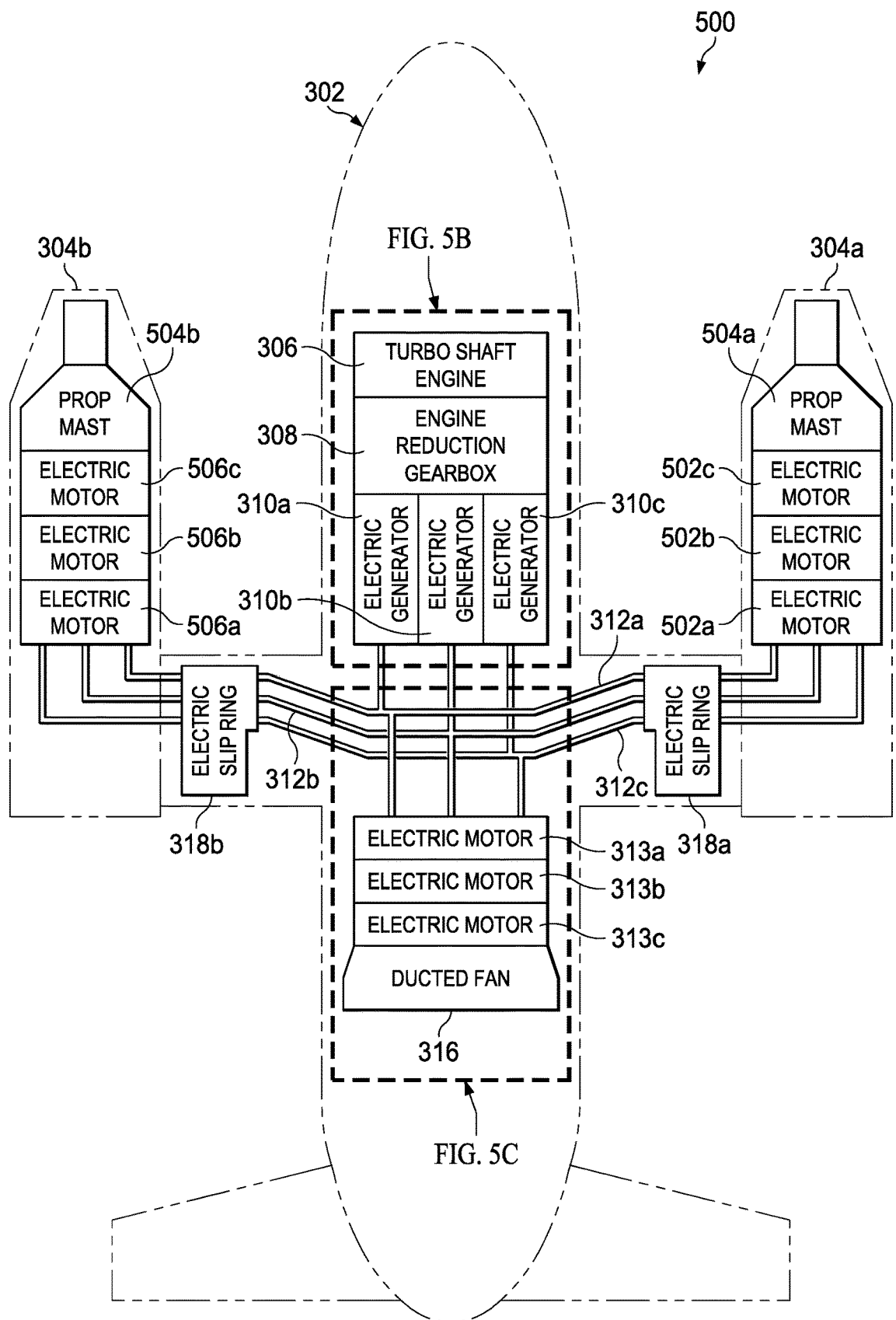
FIGS. 5A to 5C show top views of a tiltrotor high torque motor hybrid electric propulsion system of the present invention.
Figure 5B:
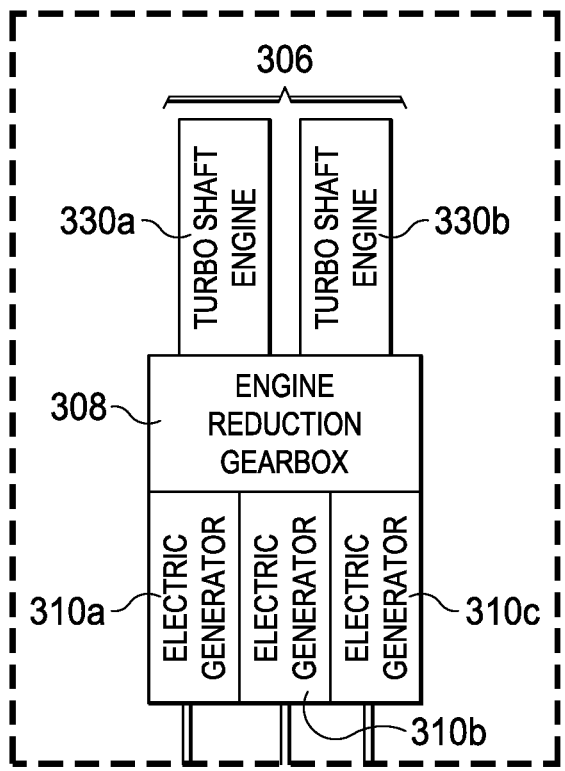
Figure 5C:
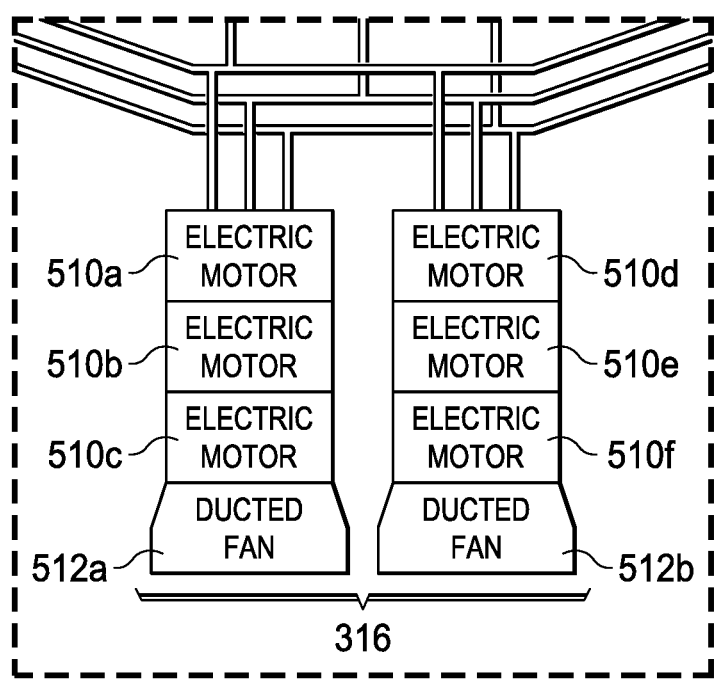

FIG. 5A shows a top-view of an electric hybrid propulsion drive train system of the present invention that incorporates distributed propulsion to provide thrust for high speed and efficient forward flight using ducted fans. Aircraft 500 is depicted having a fuselage 302 and nacelles 304a, 304b. The fuselage 302 includes one or more engines 306, which is depicted in this embodiment as a single turbo shaft engine that is connected to an engine reduction gearbox 308. Of course, the skilled artisan will recognize that for purposes of redundancy the aircraft 500 can include more than one engine as depicted in the insert. The engine reduction gearbox 308 connected to one or more electric generators (in this version three electric generators 310a, 310b, and 310c are depicted) that convert shaft power from the turbo shaft engine 306 into electrical power. The electric generators 310a, 310b, and 310c are connected, respectively, to power conduits 312a, 312b, 312c. Power conduit 312a is connected to electric motors 313a, 502a and 506a. Power conduit 312b is connected to electric motors 313b, 502b and 506b. Power conduit 312c is connected to electric motors 313c, 502c and 506c. In certain embodiments, the aircraft 500 may be a tiltrotor aircraft and the nacelles 304a, 304b tilt, which can require, e.g., an electric slip ring 318a, 318b, respectively, to connect power conduits 312a, 312b, 312c to the respective electric motors. It is possible that the various electric generators 310a, 310b, 310c, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 313a, 313b, and 313c are directly connected to a ducted fan 316 that is used to provide additional thrust to the aircraft 500. While the ducted fan 316 is depicted in this embodiment as being in the back of the aircraft 500, the skilled artisan will recognize that it may be positioned in front of the engine 306, adjacent to the engine 306 or may include more than one ducted fan 316, such as 1, 2, 3, 4, or more ducted fans. Turning to each of the nacelles 304a, 304b, each is depicted with three electric motors, however the skilled artisan will recognize that the number of electric motors can be varied depending on power-to-weight curves or restrictions, such as 1, 2, 3, 4, or more electric motors. The electric motors 502a, 502b and 502c are depicted in nacelles 304a connected directly to the prop mast 504a. The electric motors 502a, 502b and 502c will be sized to provide partial or full torque to the prop mast 504a directly. Likewise, electric motors 506a, 506b and 506c are depicted in nacelles 304b connected directly to the prop mast 504b. FIG. 5B shows the turbo shaft engine 306 in an expanded view that depicts two turbo shaft engines 330a, 330b, that connect to the engine reduction gearbox. The aircraft 500 may include 1, 2, 3, 4, or more engines. Of course, in certain embodiments the engines may be conventional jet engines or even standard combustion engines, so long as they provide shaft power to drive the reduction gearbox 308. FIG. 5C shows that the ducted fan 316 can include, in this embodiment, two ducted fans 512a, 512b, which are respectively driven directly by electric motors, in the case of ducted fan 512a connected to electric motors 510a, 510b, 510c, and in the case of ducted fan 512b connected to electric motors 510d, 510e, 510f.

Figure 6A:
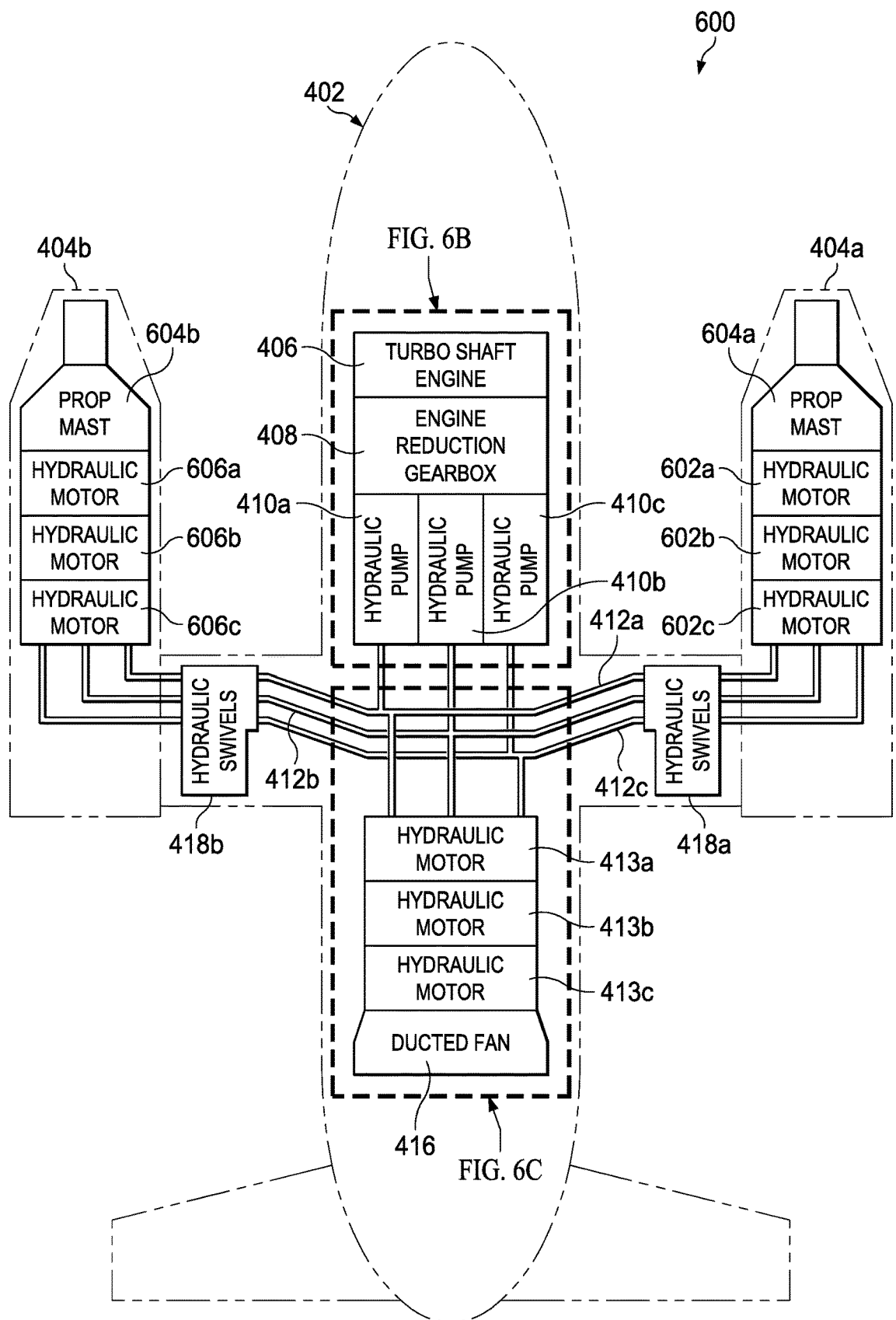
FIGS. 6A to 6C show top views of a tiltrotor high torque motor hybrid hydraulic propulsion system of the present invention.
Figure 6B:
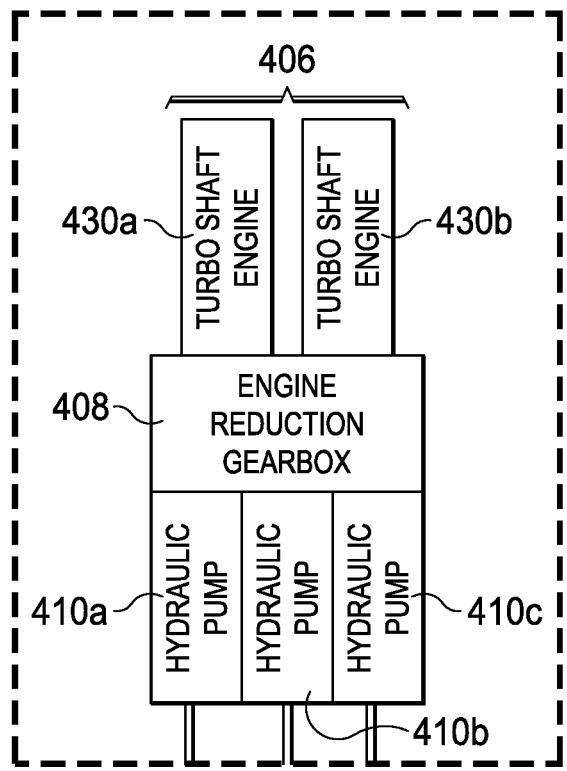
Figure 6C:
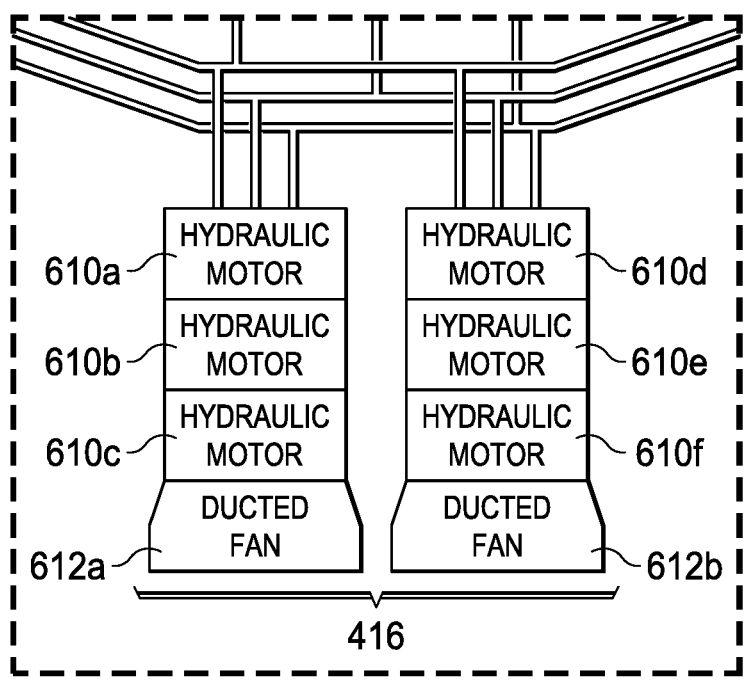

FIG. 6A shows a top-view of a hydraulic hybrid propulsion drive train system of the present invention that incorporates distributed propulsion to provide thrust for high speed and efficient forward flight using ducted fans. Aircraft 600 is depicted having a fuselage 402 and nacelles 404a, 404b. The fuselage 402 includes one or more engines 406, which is depicted in this embodiment as a single turbo shaft engine that is connected to an engine reduction gearbox 408. Of course, the skilled artisan will recognize that for purposes of redundancy the aircraft 600 can include more than one engine as depicted in the insert. The engine reduction gearbox 408 connected to one or more hydraulic pumps (in this version three hydraulic pumps 410a, 410b and 410c are depicted) that convert shaft power from the turbo shaft engine 406 into hydraulic power. The hydraulic pumps 410a, 410b and 410c are connected, respectively, to hydraulic fluid conduits 412a, 412b and 412c. Hydraulic fluid conduit 412a is connected to hydraulic motors 413a, 602a and 606a. Hydraulic fluid 412b is connected to hydraulic motors 413b, 602b and 606b. Hydraulic fluid 412c is connected to hydraulic motors 413c, 602c and 606c. In certain embodiments, the aircraft 600 may be a tiltrotor aircraft and the nacelles 404a, 404b tilt, which can require, e.g., a hydraulic swivels 418a, 418b, respectively, to connect hydraulic fluid conduits 412a, 412b and 412c to the respective hydraulic motors. It is possible that the various hydraulic pumps 410a, 410b, power a single large hydraulic motor, however, for applications in which redundancy is preferred (such as manned aircraft), it will be common to include 1, 2, 3, 4, or more hydraulic motors. The number of hydraulic motors can be optimized by, e.g., factoring the weight of the hydraulic motor, the speed of the hydraulic motor, the torque of the hydraulic motor, the weight of the aircraft, etc. In this embodiment, the hydraulic motors 413a, 413b and 413c are driving directly a ducted fan 416 that is used to provide additional thrust to the aircraft 600. While the ducted fan 416 is depicted in this embodiment as being in the back of the aircraft 600, the skilled artisan will recognize that it may be positioned in front of the engine 406, adjacent to the engine 406 or may include more than one ducted fan 416, such as 1, 2, 3, 4, or more ducted fans. Turning to each of the nacelles 404a, 404b, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 602a, 602b and 602c are depicted in nacelles 404a connected directly to the prop mast 604a. The hydraulic motors 602a, 602b and 602c will be sized to provide partial or full torque to the prop mast 604a directly. Likewise, hydraulic motors 606a, 606b and 606c are depicted in nacelles 404b connected directly to the prop mast 604b. FIG. 6B shows the turbo shaft engine 406 in an expanded view that depicts two turbo shaft engines 430a, 430b, that connect to the engine reduction gearbox 408. The aircraft 600 may include 1, 2, 3, 4, or more engines. Of course, in certain embodiments the engines may be conventional jet engines or even standard combustion engines, so long as they provide shaft power to drive the engine reduction gearbox 408. FIG. 6C shows that the ducted fan 416 can include, in this embodiment, two ducted fans 612a, 612b, which are respectively driven directly by hydraulic motors, in the case of ducted fan 612a connected to hydraulic motors 610a, 610b, 610c, and in the case of ducted fan 612b connected to hydraulic motors 610d, 610e, 610f.

Figure 7:
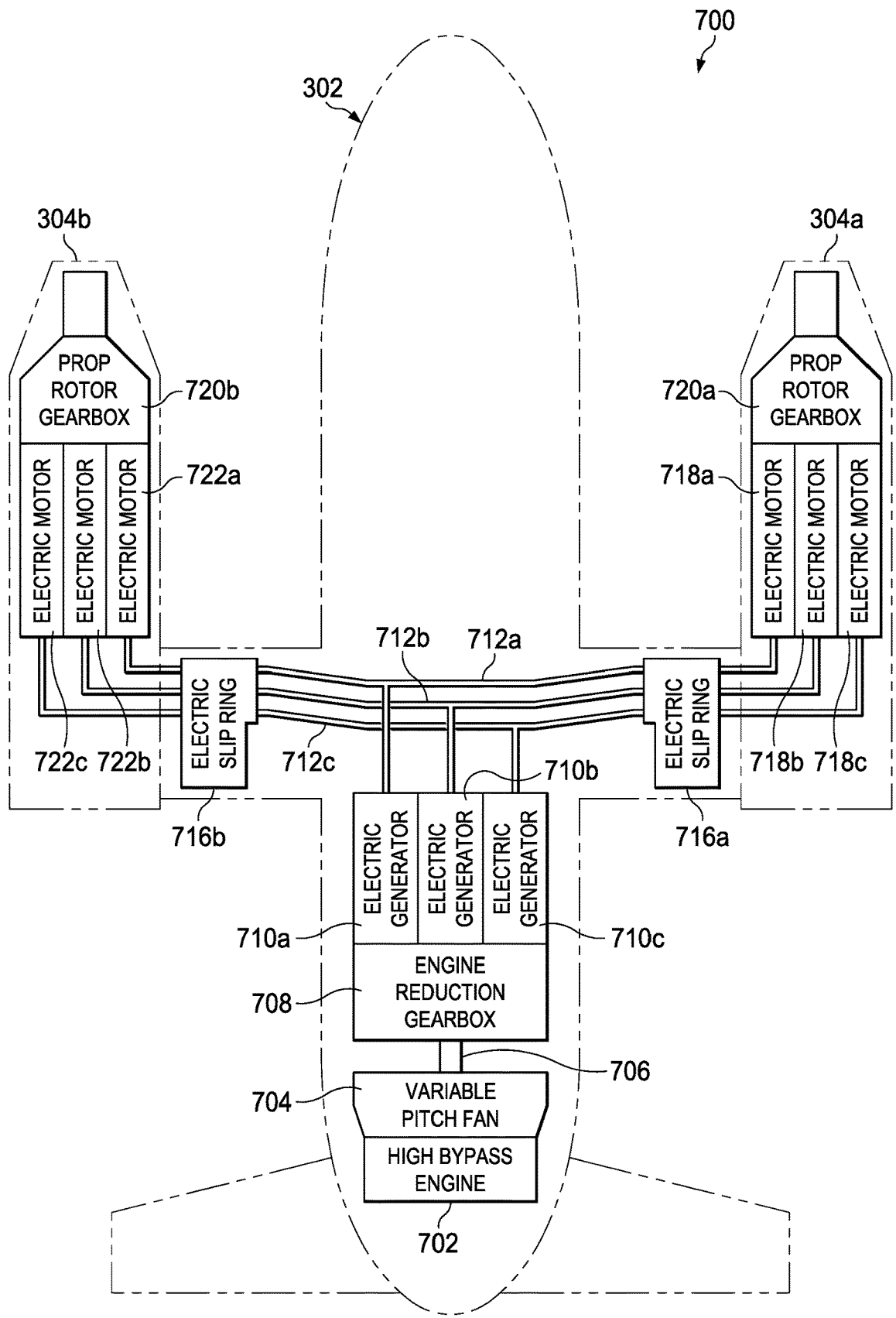
FIG. 7 shows a top view of a tiltrotor high bypass engine hybrid electric propulsion system of the present invention.

FIG. 7 shows a top-view of an electric hybrid propulsion drive train system of the present invention that incorporates distributed propulsion to provide thrust for high speed and efficient forward flight using ducted fans. Aircraft 700 is depicted having a fuselage 302 and nacelles 304a, 304b. The fuselage 302 includes one or more engines, which is depicted in this embodiment as a high bypass engine 702 that is connected by shaft 706 to an engine reduction gearbox 708. Of course, the skilled artisan will recognize that for purposes of redundancy the aircraft 700 can include more than one engine. The high bypass engine 702 can be connected directly or indirectly to a variable pitch fan 704, but also provide shaft power via shaft 706 to an engine reduction gearbox 708. The engine reduction gearbox 708 is connected to one or more electric generators (in this version three electric generators 710a, 710b and 710c are depicted) that convert shaft power from the high bypass engine 702 into electrical power. The electric generators 710a, 710b and 710c are connected, respectively, to power conduits 712a, 712b, 712c. Power conduit 712a is connected to electric motors 718a and 722a. Power conduit 712b is connected to electric motors 718b and 722b. Power conduit 712c is connected to electric motors 718c and 722c. In certain embodiments, the aircraft 700 may be a tiltrotor aircraft and the nacelles 304a, 304b tilt, which can require, e.g., an electric slip ring 716a, 716b, respectively, to connect power conduits 712a, 712b, 712c to the respective electric motors. It is possible that the various electric generators 710a, 710b, 710c, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 718a, 718b and 718c are depicted as driving a proprotor reduction gearbox 720a that is connected to a proprotor (not depicted). While the variable pitch fan 704 is depicted in this embodiment as being in front of the high bypass engine 702, the skilled artisan will recognize that it may be positioned rearward from the high bypass engine 702. Further, while depicted as a single variable pitch fan 704, variable pitch fan 704 may include more than one ducted fan, such as 2, 3, 4, or more ducted fans, which can also be positioned adjacent the high bypass engine 702 or elsewhere on the aircraft 700. Turning to each of the nacelles 304a, 304b, each is depicted with three electric motors, however the skilled artisan will recognize that the number of electric motors can be varied depending on power-to-weight curves or restrictions, such as 1, 2, 3, 4, or more electric motors. The electric motors 718a, 718b and 718c are depicted in nacelles 304a connected to drive a proprotor reduction gearbox 720a that turns a proprotor (not depicted). Likewise, the electric motors 722a, 722b and 722c are depicted in nacelles 304b to connect to and drive a proprotor reduction gearbox 720b that turns a proprotor (not depicted). Thus, the two nacelles 304a, 304b are used in a traditional manner as with all tiltrotor or vertical take off and landing craft to provide lift when the proprotors are parallel to the ground and upon take off will rotate to a position generally perpendicular to the flight during forward flight providing thrust. In certain embodiments, such as when the proprotors are foldable during flight, the proprotors may be used primarily for the initial take-off and landing, but the variable pitch fan 704 may provide addition thrust or be the primary or sole source of thrust during forward flight.

Figure 8:
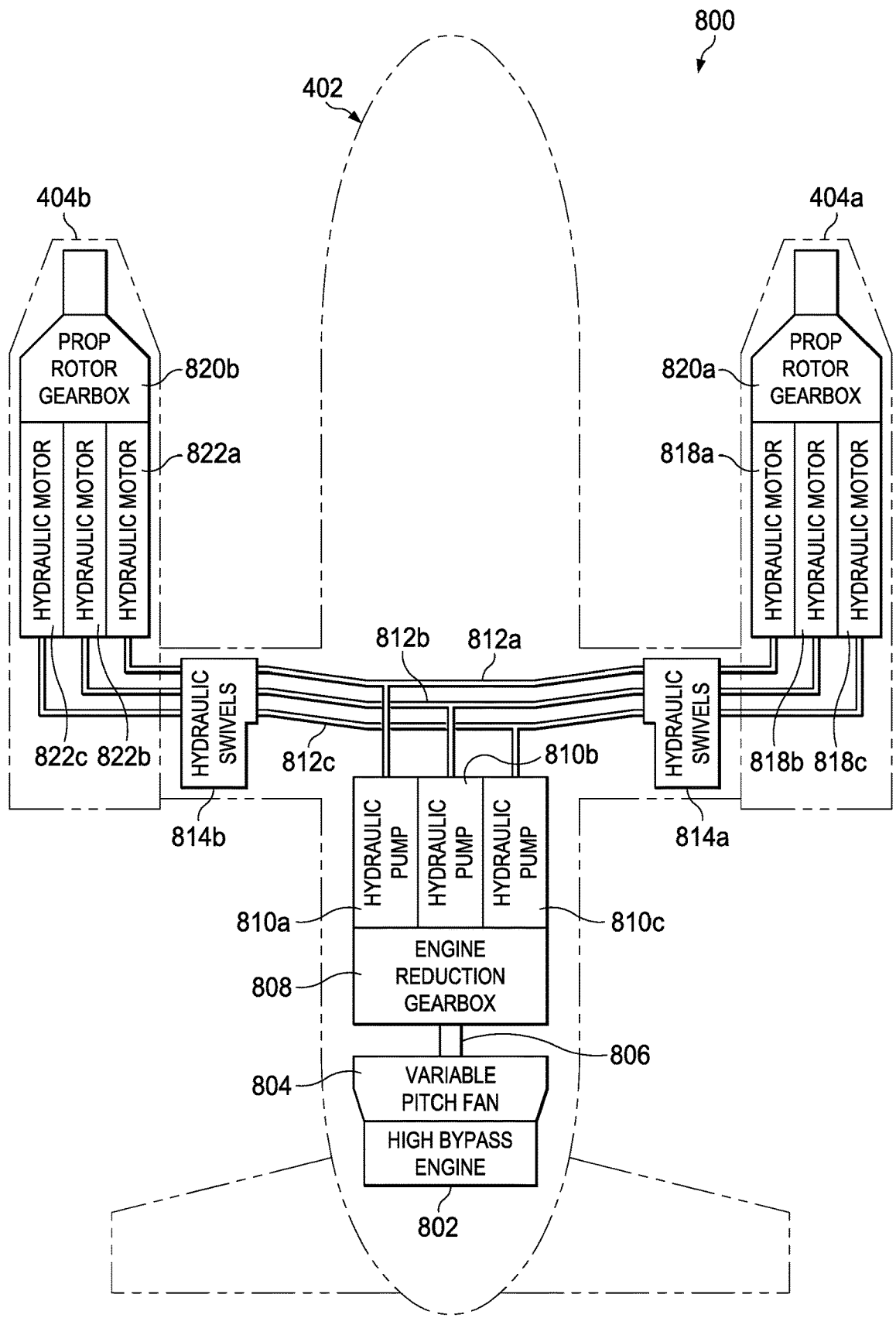
FIG. 8 shows a top view of a tiltrotor high bypass engine hybrid hydraulic propulsion system of the present invention.

FIG. 8 shows a top-view of a hydraulic hybrid propulsion drive train system of the present invention that incorporates distributed propulsion to provide thrust for high speed and efficient forward flight using ducted fans. Aircraft 800 is depicted having a fuselage 402 and nacelles 404a, 404b. The fuselage 402 includes one or more engines, which is depicted in this embodiment as a high bypass engine 802 that is connected by a shaft 806 to an engine reduction gearbox 808. Of course, the skilled artisan will recognize that for purposes of redundancy the aircraft 800 can include more than one engine. The high bypass engine 802 can be connected directly or indirectly to a variable pitch fan 804, but also provide shaft power via shaft 806 to an engine reduction gearbox 808. The engine reduction gearbox 808 is connected to one or more hydraulic pumps (in this version three hydraulic pumps 810a, 810b and 810c are depicted) that convert shaft power from the high bypass engine 802 into hydraulic power. The hydraulic pumps 810a, 810b and 810c are connected, respectively, to hydraulic conduits 812a, 812b, 812c. Hydraulic conduit 812a is connected to hydraulic motors 818a and 822a. Hydraulic conduit 812b is connected to hydraulic motors 818b and 822b. Hydraulic conduit 812c is connected to hydraulic motors 818c and 822c. In certain embodiments, the aircraft 800 may be a tiltrotor aircraft and the nacelles 404a, 404b tilt, which can require, e.g., hydraulic swivels 814a, 814b, respectively, to connect hydraulic conduits 812a, 812b, 812c to the respective hydraulic motors. It is possible that the various hydraulic pumps 810a, 810b, 810c, power a single large hydraulic motor, however, for applications in which redundancy is preferred (such as manned aircraft), it will be common to include 1, 2, 3, 4, or more hydraulic motors. The number of hydraulic motors can be optimized by factoring the weight of the hydraulic motor, the speed of the hydraulic motor, the torque of the hydraulic motor, the weight of the aircraft, etc. In this embodiment, the hydraulic motors 818a, 818b and 818c are depicted as driving a reduction gearbox 820a that connected to a proprotor (not depicted). While the variable pitch fan 804 is depicted in this embodiment as being in front of the high bypass engine 802, the skilled artisan will recognize that it may be positioned rearward from the high bypass engine 802. Further, while depicted as a single variable pitch fan 804, variable pitch fan 804 may include more than one ducted fan, such as 2, 3, 4, or more ducted fans, which can also be positioned adjacent the high bypass engine 802 or elsewhere on the aircraft 800. Turning to each of the nacelles 404a, 404b, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 818a, 818b and 818c are depicted in nacelles 404a connected to drive a prop rotor reduction gearbox 820a that turns a proprotor (not depicted). Likewise, the hydraulic motors 822a, 822b and 822c are depicted in nacelles 404b to connect to and drive a prop rotor reduction gearbox 820b that turns a proprotor (not depicted). Thus, the two nacelles 404a, 404b are used in a traditional manner as with all tiltrotor or vertical take off and landing craft to provide lift when the proprotors are parallel to the ground and upon take off will rotate to a position generally perpendicular to the flight during forward flight providing thrust. In certain embodiment, such as when the proprotors are foldable during flight, the proprotors may be used primarily for the initial take-off and landing, but the variable pitch fan 804 may provide addition thrust or be the primary or sole source of thrust during forward flight.

In certain additional embodiments, the present invention may be a hybrid propulsion drive train system in which a stop-fold tiltrotor converts from helicopter to high-speed airplane mode, as follows: (a) conversion from helicopter to low speed airplane mode: generators/pumps transmit power to proprotor electric/hydraulic motors as pylons are rotated into airplane mode and speed is increased; (b) one or more ducted fans are not powered to reduce forward thrust; and/or (c) conversion from low to high speed airplane mode: generators/pumps provide increasing power to ducted fans to generate forward thrust as power to proprotors is decreased to zero. If the proprotors are stop-fold tiltrotors, the proprotors are folded during forward flight to reduce drag. Providing power for stopping and setting to folding proprotor folding index position can be provided by the proprotor electric/hydraulic motors. Finally, in full forward flight, power to the ducted fans is increased to allow for maximum speed.

Thus, in addition to the configurations described in FIGS. 3A and 4A using high-speed electric and hydraulic motors, additional implementations of hybrid propulsion drive train systems are possible utilizing high torque electric and hydraulic motors. As shown in FIG. 5A for high torque electric and FIG. 6A for high torque hydraulic hybrid propulsion drive train systems, incorporation high torque motor technology allows for the elimination of prop rotor and ducted fan reduction gearboxes. Elimination of prop rotor and ducted fan reduction gearboxes improves aircraft reliability and reduces weight. Another implementation of hybrid propulsion drive train systems is possible utilizing a high bypass jet engine with a variable pitch fan combined with either electric or hydraulic motors. As shown in FIG. 7 for electric and FIG. 8 for hydraulic hybrid propulsion drive train systems, incorporation variable pitch fan high bypass engine technology allows for the elimination of the ducted fan reduction gearbox and drive motors. In helicopter mode, power to a bypass fan would be minimized by reducing the pitch of the fan blade or the inlet vane, while the engine core maintains required airflow. Unloading the turbofan from the generators or pumps in high-speed airplane mode is the same as other configuration. The skilled artisan will recognize that for certain specific purposes, the aircraft may combine any of the embodiments depicted in FIGS. 3A, 4A, 5A, 6A, 7 and 8 in a single aircraft. The aircraft may also include a stop-fold tiltrotor.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A hybrid propulsion system for a tiltrotor craft comprising:
   one or more engines disposed within a fuselage of the tiltrotor craft;
   two or more electrical generators, disposed within the fuselage and connected to the one or more engines;
   two rotatable nacelles, each rotatable nacelle comprising a stop-fold proprotor at a forward end of the rotatable nacelle, and each rotatable nacelle housing two or more electric motors connected to the stop-fold proprotor;
   wherein each electrical generator is connected to one of the two or more electric motors in each rotatable nacelle;
   wherein the stop-fold proprotors provide lift for vertical takeoff and landing and for stationary flight in a helicopter mode and thrust for forward flight in a first airplane mode, and are in a folded position during a second airplane mode; one or more ducted fans disposed within the fuselage and each connected to two or more additional electric motors disposed within the fuselage, each additional electric motor connected to one of the two or more electric generators, wherein the one or more ducted fans are powered and provide thrust for forward flight during the second airplane mode;
   wherein the first airplane mode is converted to the second airplane mode by increasing power to the one or more ducted fans while decreasing power to the stop-fold proprotors to zero, and folding the stop-fold proprotors; and
   wherein the second airplane mode is converted to the first airplane mode by unfolding the stop-fold proprotors, and decreasing power to the one or more ducted fans while increasing power to the stop-fold proprotors.

2. The system of claim 1, wherein the one or more engines provide direct thrust, distributed thrust, or both.

3. The system of claim 1, further comprising a reduction gearbox positioned between the one or more engines and the two or more electrical generators.

4. The system of claim 1, further comprising a proprotor reduction gearbox positioned between the two or more electrical motors, and the stop-fold proprotor.

5. The system of claim 1, wherein the stop-fold proprotors are driven directly by the two or more electrical motors.

6. The system of claim 1, wherein the one or more engines are defined further as one or more turboshaft engines, or one or more distributed engines that are not mechanically connected to one or more ducted fans, wherein the one or more engines or the one or more distributed engines provide additional thrust during the forward flight.

7. The system of claim 1, further comprising an electric slip ring that electrically connects the two or more electrical generators to the two or more electrical motors in each of the rotatable nacelles.

8. The system of claim 1, wherein the two or more electrical generators comprise two or more electric redundant generators and the two or more electric motors in each rotatable nacelle comprise two or more redundant electric motors.

9. The system of claim 1, wherein the one or more ducted fans are not powered during the helicopter mode or the first airplane mode.

10. The system of claim 1, wherein the power to the one or more ducted fans is decreased to zero during the conversion from the second airplane mode to the first airplane mode.

11. The system of claim 1, wherein the one or more ducted fans are positioned at least one of upstream, adjacent to, or downstream from, the one or more engines.

12. The system of claim 1, wherein the two or more additional electric motors comprise two or more additional redundant electric motors.

13. A method of providing propulsion to a tiltrotor craft comprising:
   providing one or more engines disposed within a fuselage of the tiltrotor craft;

providing one or more ducted fans disposed within the fuselage and each connected to two or more additional electric motors disposed within the fuselage, and provide a first thrust for forward flight;

providing two or more electrical generators disposed within the fuselage, each electrical generator connected to an engine of the one or more engines and one of the two or more additional electric motors;

providing two rotatable nacelles, each rotatable nacelle comprising a stop-fold proprotor at a forward end of the rotatable nacelle, wherein the stop-fold proprotors are distinct from the one or more ducted fans, and two or more electric motors connected to the stop-fold proprotor, wherein each electric motor is electrically connected to one of the two or more electric generators;

operating the tiltrotor craft in a helicopter mode or a first airplane mode by:
    generating an electrical power from the two or more electrical generators;
    transmitting the electrical power to the two or more electric motors in the rotatable nacelles, and
    rotating the stop-fold proprotors using the two or more electrical motors in each rotatable nacelle to provide lift for vertical takeoff and landing and stationary flight in the helicopter mode, and to provide thrust for forward flight in the first airplane mode;

operating the tiltrotor craft in a second airplane mode by powering the one or more ducted fans to provide thrust for forward flight, and the stop-fold proprotors are in a folded position;

converting the tiltrotor craft from the first airplane mode to the second airplane mode by increasing power to the one or more ducted fans while decreasing power to the stop-fold proprotors to zero, and folding the stop-fold proprotors; and converting the tiltrotor craft from the second airplane mode to the first airplane mode by unfolding the stop-fold proprotors, and decreasing power to the one or more ducted fans while increasing power to the stop-fold proprotors.

14. The method of claim 13, wherein the one or more engines provide direct thrust, distributed thrust, or both.

15. The method of claim 13, wherein the one or more engines comprise a turboshaft engine.

16. The method of claim 13, further comprising positioning a reduction gearbox between the one or more engines and the two or more electrical generators.

17. The method of claim 13, further comprising positioning a proprotor reduction gearbox between the two or more electrical motors and the stop-fold proprotor.

18. The method of claim 13, further comprising directly driving each of the stop-fold proprotors with the two or more electrical motors.

19. The method of claim 13, further comprising positioning an electric slip ring to electrically connect the two or more electrical generators to the two or more electrical motors in the rotatable nacelles.

20. The method of claim 13, wherein the two or more electrical generators comprise two or more redundant electric generators and the two or more redundant electric motors in each rotatable nacelle comprise two or more redundant electrical motors.

21. The method of claim 13, further comprising not powering the one or more ducted fans during the helicopter mode or the first airplane mode.

22. The method of claim 13, wherein decreasing the power to the one or more ducted fans is decreased comprises decreasing the power to the one or more ducted fans to zero.

23. The method of claim 13, wherein the two or more additional electric motors comprise two or more additional redundant electric motors.

24. A hybrid propulsion system for an aircraft comprising:
a turboshaft engine disposed within a fuselage of the aircraft that provides shaft power and distributed thrust;
two or more electrical generators, disposed within the fuselage and connected to the turboshaft engine;
two or more additional electric motors disposed within the fuselage, each additional electric motor connected to one of the two or more electric generators;
one or more ducted fans disposed within the fuselage of the aircraft, wherein the one or more ducted fans are each powered by the two or more additional electric motors, and provide a first thrust for forward flight during a second airplane mode;
two rotatable nacelles, each rotatable nacelle comprising a stop-fold proprotor at a forward end of the rotatable nacelle, and two or more electric motors connected to the stop-fold proprotor, wherein each electric motor is electrically connected to one of the two or more electric generators, wherein the stop-fold proprotors are distinct from the one or more ducted fans and provide lift for vertical takeoff and landing and stationary flight in the helicopter mode and a second thrust for the forward flight in a first airplane mode, and are in a folded position during the second airplane mode;
wherein the first airplane mode is converted to the second airplane mode by increasing power to the one or more ducted fans while decreasing power to the stop-fold proprotors to zero, and folding the stop-fold proprotors; and
wherein the second airplane mode is converted to the first airplane mode by unfolding the stop-fold proprotors, and decreasing power to the one or more ducted fans while increasing power to the stop-fold proprotors.

25. The system of claim 24, wherein the one or more ducted fans are not powered during the helicopter mode or the first airplane mode.

26. The system of claim 24, wherein the power to the one or more ducted fans is decreased to zero during the conversion from the second airplane mode to the first airplane mode.

27. The system of claim 24, wherein the two or more electrical generators comprise two or more electric redundant generators and the two or more electric motors in each rotatable nacelle comprise two or more redundant electric motors.

28. A tiltrotor craft comprising:
a fuselage;
one or more engines disposed within the fuselage;
two or more electrical generators disposed within the fuselage, each electrical generator connected to the one or more engines;
two wings connected to the fuselage;
two rotatable nacelles, each rotatable nacelle disposed on a respective wing and comprising:
a stop-fold proprotor disposed at a forward end of the rotatable nacelle to provide lift for vertical takeoff and landing and for stationary flight in a helicopter mode and thrust for forward flight in a first airplane mode, and are in a folded position during a second airplane mode; and two or more electric motors disposed within the rotatable nacelle and connected to the stop-fold proprotor, each electric motor connected to one of the two or more electric generators;

one or more ducted fans disposed within the fuselage and each connected to two or more additional electric motors disposed within the fuselage, each additional electric motor connected to one of the two or more electric generators, wherein the one or more ducted fans are powered and provide forward thrust for forward flight during the second airplane mode;

wherein the first airplane mode is converted to the second airplane mode by increasing power to the one or more ducted fans while decreasing power to the stop-fold proprotors to zero, and folding the stop-fold proprotors; and wherein the second airplane mode is converted to the first airplane mode by unfolding the stop-fold proprotors, and decreasing power to the one or more ducted fans while increasing power to the stop-fold proprotors.

29. The tiltrotor craft of claim 28, wherein the one or more ducted fans are not powered during the helicopter mode or the first airplane mode.

30. The tiltrotor craft of claim 28, wherein the power to the one or more ducted fans is decreased to zero during the conversion from the second airplane mode to the first airplane mode.

31. The tiltrotor craft of claim 28, wherein the two or more electrical generators comprise two or more electric redundant generators and the two or more electric motors in each rotatable nacelle comprise two or more redundant electric motors.

32. The tiltrotor craft of claim 28, wherein the two or more additional electric motors comprise two or more additional redundant electric motors.

* * * * *